Figure 5:
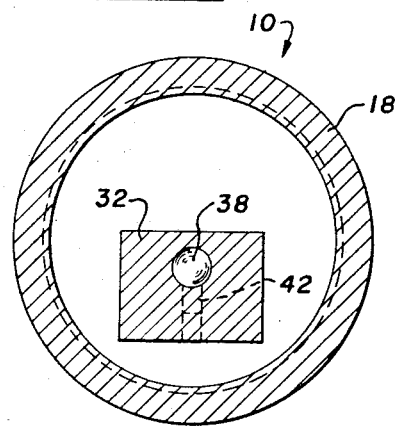

United States Patent [19]
Singer

[11] 3,746,035
[45] July 17, 1973

[54] FLOAT LEVEL CONTROL APPARATUS

[76] Inventor: Ernst Singer, 3491 Puget Drive, Vancouver, British Columbia, Canada

[22] Filed: Mar. 24, 1971

[21] Appl. No.: 127,670

[52] U.S. Cl. .............. 137/416, 73/322.5, 200/84 R, 200/84 C, 251/65
[51] Int. Cl. ...................... F16k 31/08, F16k 31/02
[58] Field of Search.................... 137/412, 413, 416, 137/418, 419, 422, 424, 425, 434; 251/65; 73/307, 308, 317, 318, 322.5; 200/84 R, 84 B, 84 C

[56] References Cited
UNITED STATES PATENTS
3,393,283 7/1968 Lenning........................ 73/322.5 X
3,483,341 12/1969 Reichensperger................ 200/84 R
2,394,994 2/1946 Gibb................................. 137/419

FOREIGN PATENTS OR APPLICATIONS
1,357,360 2/1964 France................................. 73/308

*Primary Examiner*—Martin P. Schwadron
*Assistant Examiner*—David R. Matthews
*Attorney*—Fetherstonhaugh & Co.

[57] ABSTRACT

Level control apparatus including a float chamber connected to a vertically adjustable anchor point so that the chamber swings between an upper position and a lower position as the level of the liquid in which the chamber is located rises and falls. An operating unit or ball moves back and forth along a passage connected to the float chamber as the attitude of the latter changes, to operate control means during this movement.

8 Claims, 8 Drawing Figures

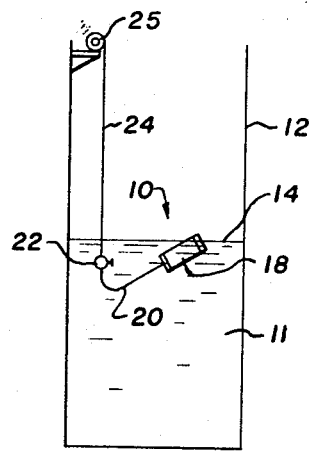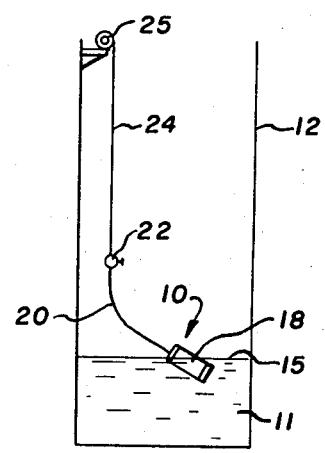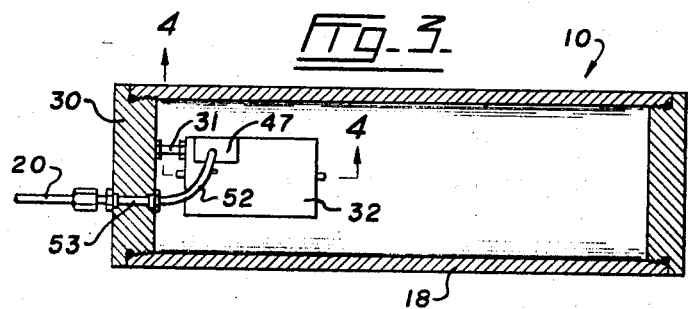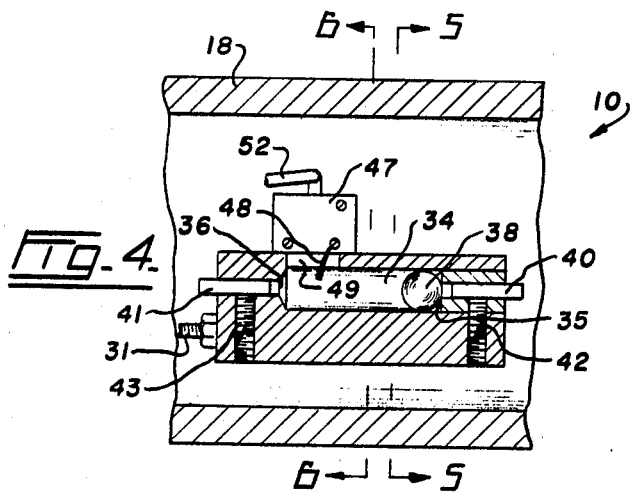

INVENTOR
ERNST SINGER

FLOAT LEVEL CONTROL APPARATUS

This invention relates to float control apparatus by means of which the level of a liquid can be adjustably controlled between a predetermined high level and a predetermined low level.

There are many float level controls for liquids in existance. However, they are relatively complicated, subject to failure and improper operation, and do not always operate satisfactorily when they are subjected to turbulence or other violent liquid action.

The present invention eliminates or greatly reduces all of these problems associated with the level controls of the prior art. This apparatus is extremely simple in construction and operation, it is almost impossible for the apparatus to function incorrectly, and it is immune to turbulence or other violent liquid action.

Level control apparatus according to the present invention includes a float chamber adapted to be placed in the body of liquid, the level of which is to be controlled. Suitable means swingably connects the chamber to an anchor point which, preferably, can be shifted up and down for adjusting purposes. The float chamber swings between an upper position and a lower position as the level of the liquid rises and falls. The apparatus also includes an elongated passage connected to the float chamber so as to move between an upwardly inclined position and a downwardly inclined position as the chamber swings between its upper and lower positions. An operating unit in the passage moves under gravity respectively towards opposite ends of said passage during this movement, and operates control means during the movement back and forth in the passage. This control means can be an electric switch adapted to be operatively connected to suitable means for changing the level of the liquid as required, or the control means can be such as to control a flow of air which is adapted to operate a pressure sensitive device for causing the liquid level to be changed. In addition, the control means can be used to operate signal devices.

Figure 6:
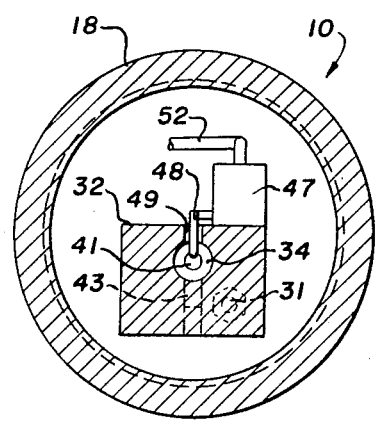
Figure 7:
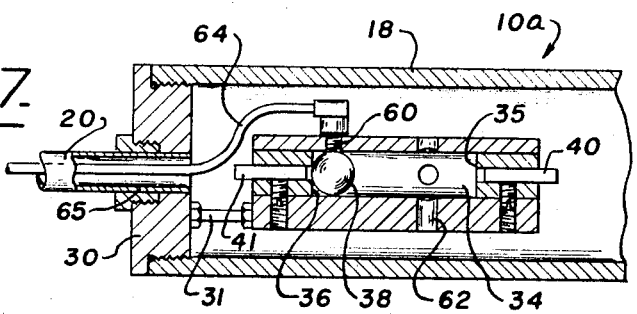
Figure 8:
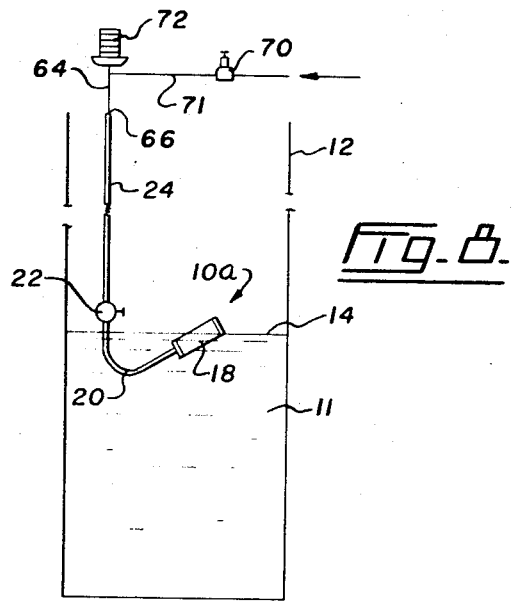

Examples of float level control apparatus in accordance with this invention are illustrated in the accompanying drawings, in which FIG. 1 diagrammatically illustrates the float level control of this invention in operation in its upper position, FIG. 2 is a view similar to FIG. 1, showing the control apparatus in its lower position, FIG. 3 is an enlarged longitudinal section through one form of level control apparatus, FIG. 4 is an enlarged section taken on the line 4—4 of FIG. 3, FIG. 5 is a cross-section taken on the line 5—5 of FIG. 4, looking in one direction, FIG. 6 is a cross-section taken on the line 6—6 of FIG. 4, looking in the opposite direction, FIG. 7 is a view similar to FIG. 4, illustrating an alternative form of float level control apparatus, and FIG. 8 diagrammatically shows the embodiments of FIG. 7 in operation.

Referring to FIGS. 1 to 6 of the drawings, 10 diagrammatically illustrates one form of float level control apparatus in accordance with this invention. Apparatus 10 is shown in a body of liquid 11, the level of which is to be controlled, said liquid body being in a container 12. This apparatus is set to control the level of the liquid between an upper level 14 and a lower level 15.

Apparatus 10 consists generally of a float chamber 18 connected by a flexible element 20 to an anchor in the form of a weight 22. This weight is connected to the lower end of a support 24, the upper end of which is supported in any suitable manner, such as by being wound on to a drum 25. It is preferable that element 20 be flexible, such as in the form of a cable or tube, and that support 24 be a flexible element, such as a cable or tube. However, for some purposes element 20 can be a rigid arm hingedly connected to anchor 22, and support 24 also can be rigid. Furthermore, if there is no need to change the mean level of the liquid, connecting element 20 can be connected to a fixed anchor point. It is, however, essential that float chamber 18 can rise and fall with the liquid, and during this time the chamber must swing between an upwardly inclined position and a downwardly inclined position. When apparatus 10 is constructed as shown in FIGS. 1 and 2, it is extremely simple, and it is very easy to change the elevation or the upper and lower levels at which the liquid is to be maintained, or to change the differential between said levels. Furthermore, the float chamber can be easily lifted out of container 12 for adjustment and servicing.

FIGS. 3 to 6 illustrate float chamber 18 and its associated elements in detail. One end of the float chamber is closed by a removable plug 30. A block 32 positioned in chamber 18 is removably connected to plug 30 in any convenient manner, such as by bolt 31. This block has a passage 34 therein and extending longitudinally thereof and having opposite ends 35 and 36. An operating unit is positioned in passage 34 and is adapted to move back and forth therein under the action of gravity. In this example, a ball 38 formed of suitable material, such as steel, is used for this purpose. This ball is positioned within passage 34 and loosely fits therein so that it can easily roll from end to end thereof. It is preferable to provide magnets 40 and 41 at passage ends 35 and 36, respectively, said magnets being adjustably held in position by set screws 42 and 43. In a very simple form of the apparatus, these magnets can be omitted, in which case the operating unit would have a shape other than round so as not to move too freely along the passage, but the magnets provide for a greater degree of control and flexibility in the apparatus. When the magnets are used, block 32 is formed of non-magnetic material.

Ball 38 rolls back and forth in passage 34 as float chamber 18 swings between its upwardly inclined and downwardly inclined positions. Control means is provided and positioned so that it is operated by ball 38 during movement thereof. In this example, the control means comprises an electric switch 47 mounted on block 32 and having an operating lever 48 projecting through a slot 49 in the block into passage 34 so that the lever is moved by the ball as the latter travels towards passage end 36. The ball holds the lever in this position as long as the ball is located at passage end 36, and in this example, lever 48 is spring loaded so that when the ball rolls away from end 36, the lever returns to its normal position projecting into the passage, as shown in FIG. 4.

An electrical cable 52 is connected to switch 47 and extends through a sealed passage 53 in plug 30. In this example, cable 52 constitutes flexible element 20 and support 24. Weight 22 is secured to this cable in any suitable manner. It is preferable to mount the weight so that it can be adjusted along support 24 or cable 52.

The operating of apparatus 10 is relatively simple. The incline of operating unit or block 32 determines the upper and lower levels of liquid 11 in container 12. When the liquid reaches level 14, ball 38 which has been held against passage end 35 by magnet 40, overcomes the magnetic force and rolls downwardly along passage 34 to end 36, moving switch lever 48 at this time to operate switch 47. This switch controls a pump, not shown, which either starts to pump liquid out of the container or ceases pumping liquid into it, depending upon the nature of the installation. As the level of the liquid drops, float 18 swings downwardly to a downwardly inclined position, and when it reaches the position shown in FIG. 2, the force of gravity is sufficient to pull ball 38 away from magnet 41 so that it will roll back to passage end 35, releasing the switch lever 48 at this time. Switch 47 stops the pump or starts it, as desired.

A limited adjustment of the differential can be attained by adjusting magnets 40 and 41 inwardly and outwardly with respect to passage 34. However, this adjustment is usually used to tune up the apparatus, and once set, usually is not changed again. The magnets are set so that when passage 34 reaches a predetermined degree of incline, gravity pulls the ball away from the adjacent magnet. For example, the working angle of the passage between the upper and lower positions of the float chamber may be from 5° to 30° above and 5° to 30° below the horizontal. The included angle depends upon the strength of the magnets and the distance each magnet is away from the ball when the latter is at the end of the passage adjacent said magnet.

The differential between the upper and lower levels of the liquid depends upon the distance between the anchor point (weight 22) and float 18. Thus, by adjusting this distance between the anchor weight and the float, the level differential is adjusted. This can be accomplished merely by shifting weight 22 along support cable 24 to change the effective length of element 20. The longer element 20 is the farther float 18 is from anchor weight 22 and therefore the greater is the level differential.

One of the main advantages of the present control apparatus lies in the fact that it is so simple there is very little that can go out of adjustment or that can fail. The ball rolling back and forth in its passage is trouble free, and the only thing liable to give trouble is switch 47, and when this on rare occassions happens, it is a very simple matter to replace this switch.

As stated, the differential between the upper and lower levels 14 and 15 can readily be adjusted. In addition, the position or elevation of these levels within container 12 can be adjusted by raising and lowering anchor weight 22. The switches used in this field prior to the present invention were adversely affected by turbulence in the liquid, but the present control apparatus is not so affected because of the fact that the ball is retained at the respective opposite ends of its passage by magnetic force.

FIGS. 7 and 8 illustrate an alternative form of level and control apparatus 10a. While in apparatus 10 the control means includes an electric switch, apparatus 10a includes pneumatic control means. This type of control is desirable in places where an electric switch cannot be used, such as when there is or is liable to be explosive gas around.

Float chamber 18 includes block 32 with its passage 34 and ball 38. In this example, the control means consists of a small orifice 60 opening into passage 34 near passage end 36 so that when ball 38 is against said end, it tends to close off the orifice. Passage 34 communicates with the interior of the float chamber through one or more openings 62 in block 32.

A tube 64 extends from orifice 60, through plug 30 and through hollow flexible element 20. In this example, element or tube 20 is hollow and communicates with the interior of the float chamber at 65, and support 24 is of tubular construction so that tube 64 can extend therethrough. The tubular support opens to atmosphere at 66 above the level of the liquid, see FIG. 8.

When apparatus 10a is in operation, a flow of air is maintained through tube 64, orifice 60, passage 34, openings 62 the interior of chamber 18, tube 20 and outlet 66. This flow is unimpeded when ball 38 is at passage end 35, but when the ball is at passage end 36, it interfers with the flow. It does not have to completely close off orifice 60, but it does impede the flow of air through said orifice so that a back pressure is created in tube 64.

The air for apparatus 10a is provided in any suitable manner, and it can operate any desired form of pressure sensitive device. In this example, air is supplied from a compressor, not shown, and it travels through a pressure reducing valve 70. Valve 70 is connected by a pipe 71 to tube 64. A pressure sensitive device, such as a pressure switch 72, is connected to tube 64 so as to respond to pressure changes in said tube.

When ball 38 is at passage end 35, the air flow is unimpeded through valve 70, tube 64 and orifice 60. This causes a pump, not shown, either to pump liquid into the container 12 or to stop pumping liquid out of the container. When the float chamber reaches the desired upper level of the liquid, ball 38 rolls to passage end 36 and obstructs orifice 60. This causes a back pressure in pressure switch 72 which either starts the pump or stops the pump, as desired.

Control apparatus 10a operates in the same manner as apparatus 10, the only difference being in the equipment that is responsive to the different angular positions of the float chamber in the body of liquid being controlled.

It will be understood that switch 47 or pressure switch 72 can be used to operate signal equipment as well as or instead of the pump for directing liquid into or out of container 12.

I claim:

1. Level control apparatus comprising a float chamber adapted to be placed in a body of liquid, means secured to the chamber for swingably connecting the chamber to an anchor point, said chamber swinging between an upper position and a lower position as the level of the liquid rises and falls, an elongated passage connected to the float chamber so as to move between an upwardly inclined position and a downwardly inclined position as the chamber swings between said upper and lower positions, a ball in the passage adapted to roll back and forth in said passage under gravity respectively towards opposite ends of said passage during said movement thereof, means near each of the opposite ends of the passage for resisting movement of the ball away from said each end until the float chamber has moved a predetermined distance to cause said movement, and control means operated by the ball as the latter moves from one end of the passage to the other end thereof.

2. Control apparatus as claimed in claim 1 in which said ball is a metal ball, and said resisting means comprises magnet means near each of the opposite ends of said passage for resisting movement of the ball away from said each end.

3. Control apparatus as claimed in claim 2 including means releasably gripping the magnet means near each end of the passage, whereby the position of each magnet means can be adjusted longitudinally of said passage.

4. Control apparatus as claimed in claim 1 in which said control means comprises an electric switch having an operating lever projecting into the passage to be moved by the ball as the latter moves along the passage and thereby operate the switch.

5. Control apparatus as claimed in claim 1 in which said control means comprises an air control having a small orifice opening into the passage near an end thereof, said operating unit when the latter is near said one end of the passage covering said orifice, and uncovering the latter when the operating unit is moved away from said one end.

6. Control apparatus as claimed in claim 5 including means for circulating air through said orifice, and a pressure sensitive control device operatively exposed to said circulating air, whereby when the operating unit covers the orifice a back pressure is created in said circulating air and causes said pressure sensitive device to operate.

7. Level control apparatus comprising a float chamber adapted to be placed in a body of liid, means secured to the chamber for swingably connecting the chamber to an anchor point, said chamber swinging between an upper position and a lower position as the level of the liquid rises and falls, an elongated passage connected to the float chamber so as to move between an upwardly inclined position and a downwardly inclined position as the chamber swings between said upper and lower positions, an operating unit in the passage adapted to move under gravity respectively towards opposite ends of said passage during said movement thereof, and control means operated by the operating unit as the latter moves from one end of the passage to the other end thereof, said control means comprising an air control having a small orifice opening into the passage near an end thereof, said operating unit when the latter is near said one end of the passage covering said orifice, and uncovering the latter when the operating unit is moved away from said one end.

8. Control apparatus as claimed in claim 7 including means for circulating air through said orifice, and a pressure sensitive control devicy operatively exposed to said circulating air, whereby when the operating unit covers the orifice a back pressure is created in said circulating air and causes said pressure sensitive device to operate.

* * * * *